(12) United States Patent
Park

(10) Patent No.: US 7,852,741 B2
(45) Date of Patent: Dec. 14, 2010

(54) RECORDING MEDIUM WITH SEGMENT INFORMATION THEREON AND APPARATUS AND METHODS FOR FORMING, RECORDING, AND REPRODUCING THE RECORDING MEDIUM

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/798,110

(22) Filed: May 10, 2007

(65) Prior Publication Data

US 2007/0211590 A1    Sep. 13, 2007

Related U.S. Application Data

(63) Continuation of application No. 11/061,665, filed on Feb. 22, 2005.

(30) Foreign Application Priority Data

May 31, 2004 (KR) .................. 10-2004-0039143

(51) Int. Cl.
*G11B 7/24* (2006.01)
(52) U.S. Cl. .................................. 369/275.1
(58) Field of Classification Search .............. 369/47.14, 369/53.16, 59.25, 124.07
See application file for complete search history.

(56) References Cited

U.S. PATENT DOCUMENTS

| | | | |
|---|---|---|---|
| 5,237,553 A | 8/1993 | Fukushima et al. | |
| 5,315,447 A | 5/1994 | Nakayama et al. | |
| 5,386,402 A | 1/1995 | Iwata | |
| 5,448,728 A | 9/1995 | Takano et al. | |
| 5,552,776 A | 9/1996 | Wade et al. | |
| 5,815,485 A | 9/1998 | Tanaka et al. | |
| 6,115,346 A | 9/2000 | Sims | |
| 6,330,210 B1 | 12/2001 | Weirauch et al. | |
| 6,351,788 B1 | 2/2002 | Yamazaki et al. | |
| 6,526,522 B1 | 2/2003 | Park et al. | |
| 6,580,684 B2 * | 6/2003 | Miyake et al. ........... | 369/275.3 |
| 6,621,783 B1 | 9/2003 | Murata | |
| 6,691,209 B1 | 2/2004 | O'Connell | |
| 6,725,200 B1 | 4/2004 | Rost | |

(Continued)

FOREIGN PATENT DOCUMENTS

CN        1441430        9/2003

(Continued)

OTHER PUBLICATIONS

Search report issued Aug. 4, 2008 by the European Patent Office in counterpart European Patent Application No. 07110264.4-2223.

(Continued)

*Primary Examiner*—Joseph H Feild
*Assistant Examiner*—Henok G Heyi
(74) *Attorney, Agent, or Firm*—Harness, Dickey & Pierce, P.L.C.

(57) ABSTRACT

A recording medium, such as a high-density and/or optical recording medium including segment information recorded thereon, and apparatus and methods for recording to and reproducing from the recording medium, in order to improve data protection, data management and/or reproduction compatibility.

40 Claims, 11 Drawing Sheets

U.S. PATENT DOCUMENTS

| | | | |
|---|---|---|---|
| 6,765,853 B1 | 7/2004 | Ko et al. | |
| 6,785,839 B2 | 8/2004 | Ko et al. | |
| 6,912,188 B2 | 6/2005 | Morishima | |
| 6,963,523 B1 | 11/2005 | Park | |
| 7,117,230 B1* | 10/2006 | Green et al. | 1/1 |
| 7,133,333 B2 | 11/2006 | Ko | |
| 7,219,202 B2 | 5/2007 | Satoyama et al. | |
| 7,230,893 B2 | 6/2007 | Park | |
| 2001/0018727 A1 | 8/2001 | Ando et al. | |
| 2002/0036643 A1 | 3/2002 | Namizuka et al. | |
| 2002/0078295 A1 | 6/2002 | Shaath et al. | |
| 2002/0136118 A1 | 9/2002 | Takahashi | |
| 2002/0136134 A1 | 9/2002 | Ito et al. | |
| 2003/0035355 A1 | 2/2003 | Morishima | |
| 2003/0048731 A1 | 3/2003 | Ozaki | |
| 2003/0137910 A1 | 7/2003 | Ueda et al. | |
| 2003/0137915 A1 | 7/2003 | Shoji et al. | |
| 2003/0169660 A1 | 9/2003 | Shirai et al. | |
| 2003/0185130 A1 | 10/2003 | Kamperman et al. | |
| 2003/0210627 A1 | 11/2003 | Ijtsma et al. | |
| 2003/0212564 A1* | 11/2003 | Sawabe et al. | 704/500 |
| 2004/0013061 A1 | 1/2004 | Wu | |
| 2004/0017482 A1 | 1/2004 | Weitman | |
| 2004/0174782 A1 | 9/2004 | Lee et al. | |
| 2004/0174793 A1* | 9/2004 | Park et al. | 369/59.25 |
| 2004/0193946 A1 | 9/2004 | Park et al. | |
| 2004/0218488 A1 | 11/2004 | Hwang et al. | |
| 2004/0228238 A1 | 11/2004 | Ko et al. | |
| 2004/0246852 A1 | 12/2004 | Hwang et al. | |
| 2005/0111315 A1 | 5/2005 | Hwang et al. | |
| 2005/0169132 A1 | 8/2005 | Kuraoka et al. | |
| 2005/0195716 A1* | 9/2005 | Ko et al. | 369/53.16 |
| 2005/0207294 A1 | 9/2005 | Park | |
| 2005/0207318 A1 | 9/2005 | Park | |
| 2005/0207320 A1 | 9/2005 | Park | |
| 2005/0259560 A1 | 11/2005 | Park | |
| 2006/0120697 A1 | 6/2006 | Beged-Dov et al. | |
| 2006/0221689 A1 | 10/2006 | Yoshida et al. | |
| 2006/0280068 A1 | 12/2006 | Weirauch et al. | |
| 2007/0053267 A1 | 3/2007 | Brondijk | |
| 2007/0211589 A1 | 9/2007 | Park | |
| 2007/0211590 A1* | 9/2007 | Park | 369/47.1 |

FOREIGN PATENT DOCUMENTS

| | | |
|---|---|---|
| EP | 0 495 471 | 7/1992 |
| EP | 1 061 517 | 12/2000 |
| EP | 1 251 508 | 10/2002 |
| EP | 1 306 840 A2 | 5/2003 |
| EP | 1 329 888 A1 | 7/2003 |
| EP | 1 381 047 | 1/2004 |
| EP | 1 505 597 | 2/2005 |
| EP | 1 506 597 | 2/2005 |
| EP | 1 587 102 | 10/2005 |
| EP | 1 887 577 A2 | 2/2008 |
| JP | 06-259886 | 9/1994 |
| JP | 07-200182 | 8/1995 |
| JP | 09-213011 | 8/1997 |
| JP | 10-049986 | 2/1998 |
| JP | 10-092149 | 4/1998 |
| JP | 11-039801 | 2/1999 |
| JP | 11066751 | 3/1999 |
| JP | 2001-126407 | 10/1999 |
| JP | 2000-285029 | 10/2000 |
| JP | 2000-322841 | 11/2000 |
| JP | 2001351334 | 12/2001 |
| JP | 2002-015525 | 1/2002 |
| JP | 2002-092873 | 3/2002 |
| JP | 2002-124037 | 4/2002 |
| JP | 2002-175668 | 6/2002 |
| JP | 2002-278821 | 9/2002 |
| JP | 2002-328848 | 11/2002 |
| JP | 2003-059063 | 2/2003 |
| JP | 2003-208779 | 7/2003 |
| JP | 2003-228835 | 8/2003 |
| JP | 2003-242650 | 8/2003 |
| JP | 2003-346426 | 12/2003 |
| JP | 2004-005842 | 1/2004 |
| JP | 2004-030779 | 1/2004 |
| JP | 2007-503820 | 3/2005 |
| JP | 2006-313628 | 11/2006 |
| JP | 2008-052289 | 3/2010 |
| MX | PA05001548 A | 5/2005 |
| RU | 2208844 | 7/2003 |
| RU | 2 269 829 C2 | 2/2006 |
| RU | 2005-114052 | 11/2006 |
| WO | WO 00/45386 | 8/2000 |
| WO | WO 01/01416 A1 | 1/2001 |
| WO | WO 01/18731 A1 | 3/2001 |
| WO | WO 02/067093 A2 | 8/2002 |
| WO | 03/030173 | 4/2003 |
| WO | WO 03/102936 | 12/2003 |
| WO | WO 04/001753 | 12/2003 |
| WO | WO 04/001754 | 12/2003 |
| WO | WO 2004/019326 A1 | 3/2004 |
| WO | WO 2004/079730 A1 | 9/2004 |
| WO | WO 2004/081936 A1 | 9/2004 |
| WO | WO 2004/100159 A1 | 11/2004 |
| WO | WO 2005/004154 A2 | 1/2005 |
| WO | WO 2005/086598 | 9/2005 |
| WO | WO 2005/088636 A1 | 9/2005 |

OTHER PUBLICATIONS

Search report issued Jul. 30, 2008 by the European Patent Office in counterpart European Patent Application No. 07150328.8-2223.

Office Action issued Sep. 12, 2008 by the USPTO in counterpart U.S. Appl. No. 11/155,485.

Office Action issued Sep. 3, 2008 by the USPTO in counterpart U.S. Appl. No. 11/085,134.

Office Action issued Oct. 31, 2008 by the Chinese Patent Office in counterpart Chinese Patent Application No. 200710104074.X (with English language translation).

Office Action issued Jan. 10, 2008 by the Mexican Patent Office in a counterpart Mexican Patent Application.

Office Action issued Oct. 2, 2008 by the Mexican Patent Office in a counterpart Mexican Patent Application.

Office Action issued Mar. 18, 2009 by the Russian Patent Office in counterpart Russian Patent Application No. 2006136782/28 (English language translation).

Office Action issued Apr. 29, 2009 by the USPTO in counterpart U.S. Appl. No. 11/812,904.

Office Action issued May 26, 2009 by the USPTO in related U.S. Appl. No. 11/798,109.

Decision on Grant issued Jun. 31, 2009 by the Russian Patent Office in counterpart Russian Patent Application No. 2006136783/28 (with English language translation).

Office Action issued Apr. 29, 2009 by the USPTO in counterpart U.S. Appl. No. 11/812,904.

"120 mm DVD Rewritable Disk (DVD-RAM)", ECMA Standardizing Information and Communication Systems, Standard ECMA-272, 2$^{nd}$ Edition, Jun. 1999.

Australian Office Action dated Oct. 30, 2009.

"Blu-ray Disc, Rewritable Blu-ray Disc (BD-RE) Multi-Media Command Set Description", Version 0.80, Nov. 9, 2004.

Search Report for corresponding European Application No. 07120323.2 dated May 23, 2008.

Search Report for corresponding European Application No. 071111355.9 dated May 15, 2008.

European Office Communication for corresponding European Application No. 04808643.3 dated May 14, 2008.

Russian Notice of Allowance dated Oct. 22, 2009 for counterpart Russian application No. 2006136782/28(040043) and English translation.

Japanese Office Action dated Nov. 6, 2009 for counterpart Japanese application No. 2007-159500 and English translation.

Japanese Office Action dated Nov. 6, 2009 for counterpart Japanese application No. 2007-503825 and English translation.

Japanese Office Action dated Mar. 2, 2010 for counterpart application No. 2007-503820 and English translation.

Japanese Office Action dated Mar. 2, 2010 for counterpart application No. 2008-052289 and English translation.

Japanese Notice of Allowance dated Jun. 4, 2010 for corresponding Application No. 2007-503821.

Japanese Office Action dated Jun. 4 2010 for corresponding Application No. 2008-033295.

Chan M.Y. et al.: "Two Simple Schemes for Access Control", IEEE International Symposium on Information Theory, Sep. 17-22, 1995, p. 355.

* cited by examiner

|  |  | BD-RE | BD-R | BD-ROM |
|---|---|---|---|---|
| INFO2 | Reserved | 128 | 128 | 160 |
|  | PAC 2 | 32 | 32 | 32 |
|  | DMA2 | 32 | 32 |  |
|  | CD2 | 32 | 32 | 32 |
|  | BZ3 | 32 | 32 | 32 |
|  |  |  |  |  |
| INFO1 | BZ2 | 32 | 32 | 192 |
|  | Drive Area | 32 | 128 |  |
|  | Reserved | 96 |  |  |
|  | DMA1 | 32 | 32 |  |
|  | CD1 | 32 | 32 | 32 |
|  | BZ1-PAC1 | 32 | 32 | 32 |

FIG. 4

| | Sector in each PAC | Data Byte Position | Description |
|---|---|---|---|
| Common Header for all PACs | 0 | $D_0$ to $D_3$ | PAC_ID |
| | 0 | $D_4$ to $D_7$ | Reserved |
| | 0 | $D_8$ to $D_{11}$ | Unknown PAC Rules |
| | 0 | $D_{12}$ to $D_{13}$ | Reserved |
| | 0 | $D_{14}$ | Entire Disc Flag |
| | 0 | $D_{15}$ | Number of Segments |
| | 0 | $D_{16}$ to $D_{23}$ | Segment_0 |
| | 0 | $D_{24}$ to $D_{31}$ | Segment_1 |
| | 0 | ... | ... |
| | 0 | $D_{264}$ to $D_{271}$ | Segment_31 |
| | 0 | $D_{272}$ to $D_{383}$ | Reserved(not used) |
| | 0 | $D_{384}$ to $D_{2047}$ | Reserved for Specific PAC |
| PAC specific information | 1 to 31 | $D_0$ to $D_{2047}$ | Reserved for Specific PAC |

FIG. 5

| Area | Control | | Number of bits |
|---|---|---|---|
| | Read | Write | |
| PAC zones 1,2 | Yes | Yes | 2 · 10 |
| Individual PACs | Yes | Yes | 2 |
| Control Data zones 1,2 | Yes | Yes | 2 |
| DMA zones 1,2 | No | Yes | 1 |
| Replacement clusters | No | Yes | 1 |
| Data Zone | Yes | Yes | 2 |
| Logical Overwrite | No | Yes | 1 |
| Reserved Area | Yes | Yes | 2 · 10 |
| Buffer zone 3 | Yes | Yes | 2 · 0 |
| Buffer zone 2 | Yes | Yes | 2 · 0 |
| Drive Area | No | No | 0 |
| Reserved Area | Yes | Yes | 2 · 6 |
| Buffer Zone 1 | Yes | Yes | 2 · 0 |
| Reserved for future areas | | | 11 · 6 |

FIG. 7

| Sector in each PAC | Data Byte Position | Description | |
|---|---|---|---|
| 0 | $D_0$ to $D_3$ | PAC_ID | Common Header for all PACs |
| 0 | $D_4$ to $D_7$ | Unknown PAC Rules | |
| 0 | $D_8$ | PAC Header Tag | |
| 0 | $D_9$ | Entire_disc_flag | |
| 0 | $D_{10}$ | Number of Segments | |
| 0 | $D_{11}$ to $D_{15}$ | Reserved | |
| 0 | $D_{16}$ to $D_{23}$ | Segment_0 | |
| 0 | $D_{24}$ to $D_{31}$ | Segment_1 | |
| ⋮ | ⋮ | ⋮ | |
| 0 | $D_{264}$ to $D_{271}$ | Segment_31 | |
| 0 | $D_{272}$ to $D_{383}$ | Recorder_ID | |
| 0 | $D_{384}$ to $D_{2047}$ | Reserved for Specific PAC | |
| 1 to 31 | $D_0$ to $D_{2047}$ | Reserved for Specific PAC | PAC specific information |

FIG. 8

| | Sector in each PAC | Data Byte Position | Description |
|---|---|---|---|
| Common Header for all PACs | 0 | $D_0$ to $D_3$ | PAC_ID |
| | 0 | $D_4$ to $D_7$ | Unknown PAC Rules |
| | 0 | $D_8$ | PAC Header Tag |
| | 0 | $D_9$ | Entire_disc_flag |
| | 0 | $D_{10}$ to $D_{11}$ | Byte address for the Set of Segments |
| | 0 | $D_{12}$ to $D_{13}$ | Number of segments defined in the Set(N_Segs) |
| | 0 | $D_{14}$ to $D_{21}$ | Reserved for Segment ⎫ |
| | 0 | $D_{22}$ to $D_{29}$ | Reserved for Segment ⎬ N_Segs |
| | 0 | ... | ... ⎪ |
| | 0 | $D_{262}$ to $D_{269}$ | Reserved for Segment ⎭ |
| | 0 | $D_{270}$ to $D_{381}$ | Reserved_ID |
| | 0 | $D_{382}$ to $D_{2047}$ | Reserved for Specific PAC |
| PAC specific information | 1 to 31 | $D_0$ to $D_{2047}$ | Reserved for Specific PAC |

FIG. 9

| | Sector in each PAC | Data Byte Position | Description |
|---|---|---|---|
| Common Header for all PACs | 0 | $D_0$ to $D_3$ | PAC_ID |
| | 0 | $D_4$ to $D_7$ | Unknown PAC Rules |
| | 0 | $D_8$ | PAC Header Tag |
| | 0 | $D_9$ | Entire_disc_flag |
| | 0 | $D_{10}$ to $D_{11}$ | Byte address for the Main Set of Segments |
| | 0 | $D_{12}$ to $D_{13}$ | Number of segments defined in the Main Set($N\_M\_Segs$) |
| | 0 | $D_{14}$ to $D_{15}$ | Byte address for the Additional Set of Segments |
| | 0 | $D_{16}$ to $D_{17}$ | Number of segments defined in the Additional Set($N\_A\_Segs$) |
| | 0 | $D_{18}$ to $D_{25}$ | Reserved for Main Set of Segmenst $\}N\_M\_Segs$ |
| | 0 | ... | ... |
| | 0 | $D_{266}$ to $D_{273}$ | Reserved for Main Set of Segmenst |
| | 0 | $D_{274}$ to $D_{385}$ | Reserved_ID $\}N\_A\_Segs$ |
| | 0 | $D_{385}$ to $D_{2047}$ | Reserved for Specific PAC |
| PAC specific information | 1 ~ | $D_0$ ~ | Reserved for Specific PAC |
| | ~ 31 | ~ $D_{2047}$ | Unused part in the specific PAC |

RECORDING MEDIUM WITH SEGMENT INFORMATION THEREON AND APPARATUS AND METHODS FOR FORMING, RECORDING, AND REPRODUCING THE RECORDING MEDIUM

CROSS-REFERENCE TO RELATED APPLICATIONS

This U.S. non-provisional application is a continuation application of U.S. application Ser. No. 11/061,665 filed Feb. 22, 2005, the entire contents of which is hereby incorporated by reference.

BACKGROUND OF THE INVENTION

1. Field of the Invention

The present invention relates to managing physical access control (PAC) and recording data, media containing PAC and recording data (for example, high density optical discs, such as Blu-ray Disc) and apparatus and methods for recording and/or reproducing data to and/or from the media.

2. Discussion of the Related Art

Media, for example, optical discs may be used for recording a large quantity of data. Of the optical discs available, a new high density optical media (HD-DVD), for example, the Blu-ray Disc (hereafter called as "BD") is under development, which enables increased recording and/or storing of high definition video and/or audio data.

BD further includes a rewritable Blu-ray disc (BD-RE), Blu-ray disc writable once (BD-WO), and Blu-ray disc read only (BD-ROM).

Currently, one problem with existing systems is the potential incompatibility between drives of different versions, for example a drive of a previous version with a previous set of capabilities may have difficulty interacting with a medium that has interacted with a drive including at least one capability from a subsequent set of capabilities.

SUMMARY OF THE INVENTION

Example embodiments of the present invention provide access control information including segment information on a medium, such as a high density optical disc, and apparatus and methods for recording data to and reproducing data from the medium using the access control information including the segment information.

Example embodiments of the present invention provide access control information including segment information recorded thereon, in order to improve data protection, improve data management, improve reproduction compatibility, avoid destruction of data, and/or reduce unnecessary, repetitive operations.

Example embodiments of the present invention provide a medium, such as a high density optical disc, and apparatus and methods for managing access control information including segment information.

An example embodiment provides a recording medium. The recording medium includes a user data area including a plurality of segment regions, and a control data area storing access control information for controlling access to segment regions. The access control information includes segment information of the segment regions. The segment information includes a segment number identifying a total number of the segment regions. The maximum value of the segment number is defined.

An example embodiment provides a method of recording to and/or reproducing from a recording medium. The method includes recording and/or reproducing access control information for controlling access to the plurality of segment regions in a user data area, and controlling recording to and/or reproducing from the segment regions according to the access control information, if the access control information is unknown. The access control information including a segment number identifying a total number of the segment regions. The maximum value of the segment number is defined.

An example embodiment provides an apparatus for recording to and/or reproducing from a recording medium. The apparatus includes an optical device for writing and/or reading a data to/from the recording medium, and a controller for controlling the optical device based on access control information for controlling access to a plurality of segment regions in a user data area. The access control information includes a segment number identifying a total number of the segment regions, the maximum value of the segment number being defined.

An example embodiment provides a system for recording to and/or reproducing from a recording medium. The system includes a host device for generating command of recording to and/or reproducing from the recording medium, and an apparatus for recording to and/or reproducing from the recording medium according to the command. The apparatus includes an optical part and a controller for controlling access to a plurality of segment regions in a user data area. The access control information includes a segment number identifying a total number of the segment regions. The maximum value of the segment number is defined.

BRIEF DESCRIPTION OF THE DRAWINGS

The accompanying drawings, which are included to provide a further understanding of example embodiments of the invention and are incorporated in and constitute a part of this application, illustrate example embodiment(s) of the invention where.

FIG. 4 illustrates a PAC on a high density optical disc in accordance with an example embodiment of the present invention;

FIG. 5 illustrates an "Unknown PAC Rules" field in accordance with an example embodiment of the present invention;

FIG. 7 illustrates a PAC on a high density optical disc in accordance with another example embodiment of the present invention;

FIG. 8 illustrates a PAC on a high density optical disc in accordance with another example embodiment of the present invention;

FIG. 9 illustrates a PAC on a high density optical disc in accordance with another example embodiment of the present invention;

DETAILED DESCRIPTION OF EXAMPLE EMBODIMENTS OF THE INVENTION

Reference will now be made in detail to example embodiments of the present invention, illustrated in the accompanying drawings. Wherever possible, the same reference numbers will be used throughout the drawings to refer to the same or like parts.

Figure 1:
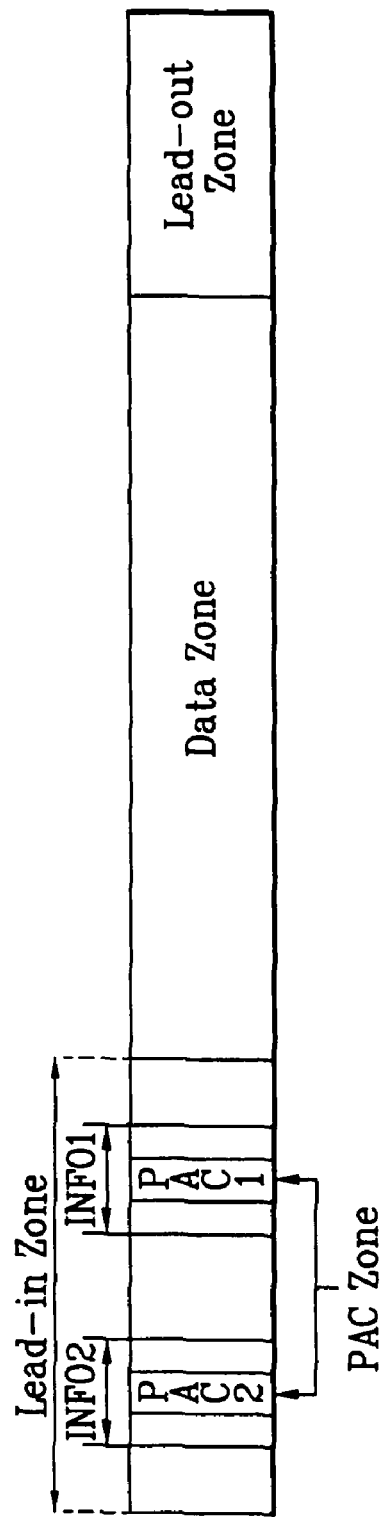
FIG. 1 illustrates a diagram showing PAC zones on a high density optical disc in accordance with an example embodiment of the present invention.

FIG. 1 illustrates PAC zones on a high density optical disc in accordance with an example embodiment of the present invention.

Referring to FIG. 1, the high density optical disc may be partitioned from an inner circumference to an outer circumference, into a lead-in zone, a data zone, and a lead-out zone.

The lead-in zone may be further partitioned into an INFO2 zone and an INFO1 zone for recording various kinds of information thereon. The INFO2 zone and an INFO1 zone may include PAC (Physical Access Control) zones.

For convenience, a PAC zone assigned to the INFO2 zone is labeled a PAC2 zone and the PAC zone assigned to the INFO1 zone is labeled a PAC1 zone. One of the PAC2 zone and the PAC1 zone may have an original PAC recorded thereon and the other one may have a back up zone for recording a copy of the original PAC. If a writing direction is from the inner circumference to the outer circumference of the disc, it may be advantageous that the original PAC is recorded on the PACII zone and the backup PAC is recorded on the PACI zone.

The PAC zone may be provided to handle problems that may occur when an older version of a drive apparatus cannot detect functions on a disc added having functions compatible with a newer version of a drive apparatus. The PAC zone may handle compatibility problems using one or more an "unknown rules".

An "unknown rule" may be used to control predictable operations of the disc, for example, basic control of read, write, etc., linear replacement of a defective zone, logical overwrite, etc. An area may also be provided on the disc, indicating where the "unknown rule" is applicable, for example, segments for defining the entire disc or a certain portion of the disc, which is described later in more detail.

Thus, by defining an area of the disc, an older version drive apparatus is able to access by using the "unknown rule", a newer version of the disc reduces unnecessary access operation of the older version drive apparatus.

Moreover, by defining an accessible area on a physical area of the disc for an older version drive apparatus to access by using the PAC, a data area containing user data recorded thereon can be protected more robustly and/or unauthorized access (for example, hacking) of the disc may be prevented or reduced.

The INFO2 zone and the INFO1 zone having the PACII and I zones therein in the lead-in zone may be reviewed in view of writable characteristics of the high density optical disc.

Figures 2, 3:
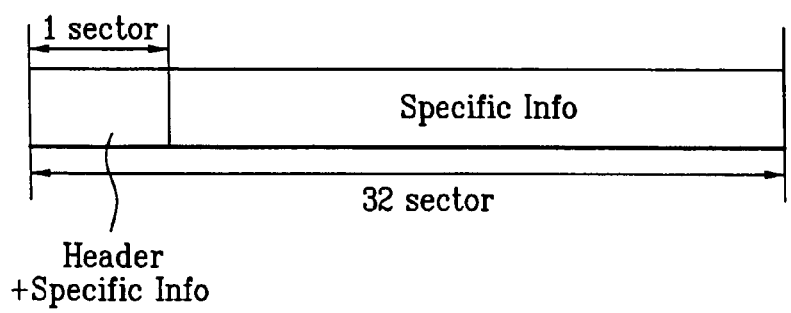
FIG. 2 illustrates a diagram showing configurations of INFO2 zone and INFO1 zone on a high density optical disc in accordance with an example embodiment of the present invention.
FIG. 3 illustrates a PAC recorded on a high density optical disc in accordance with an example embodiment of the present invention.

FIG. 2 illustrates a diagram showing configurations of the INFO2 zone and the INFO1 zone on a high density optical disc in accordance with an example embodiment of the present invention.

Referring to FIG. 2, for an example BD-RE high density optical disc, the INFO2 zone may have 256 clusters including 32 clusters of PACII zone, 32 clusters of DMA (Defect Management Area) 2 zone for management of defects, 32 clusters of CD (Control Data) 2 zone having control information recorded thereon, and/or 32 clusters of BZ (Buffer Zone) 3 zone of a buffer zone.

The INFO1 zone may include 32 clusters of BZ2 zone of a buffer area, 32 clusters of drive area which may be a drive area for storing information specific to a drive, 32 clusters of DMA1 zone for managing defects, 32 clusters of CD1 zone for recording control information, and/or a BZ1-PACI zone utilizable as the PAC zone.

For a write once high density optical disc (BD-R), the INFO2 zone may have 256 clusters including a PACII zone, a DMA 2 zone, a CD 2 zone, and a BZ 3 zone, each with 32 clusters, and the INFO1 zone includes a BZ2 zone, a DMA1 zone, a CD1 zone, and/or a BZ1-PACI zone, each with 32 clusters, and 128 clusters of drive area.

For a read only high density optical disc (BD-ROM), the INFO2 zone may have 256 clusters including a PACII zone, a CD 2 zone, and a BZ 3 zone, each with 32 clusters, and the INFO1 zone 256 clusters including a CD1 zone, and/or a BZ1-PACI zone, each with 32 clusters.

The PAC zones of example embodiments of the present invention may be assigned to the INFO2 zone and/or the INFO1 zone in the lead-in zone in 32 clusters each, according to rewritable characteristics of the high density optical disc.

In the PAC zone of 32 clusters, one PAC may have one cluster, for recording a plurality of valid PACs. An example structure in which one PAC is recorded as one cluster is described with reference to FIG. 3.

FIG. 3 illustrates a PAC recorded on a high density optical disc in accordance with an example embodiment of the present invention.

Referring to FIG. 3, one PAC of one cluster size (32 sectors) may include a header zone and a specific information zone, specific to a particular disc drive (for example, optical disc drive).

The PAC header zone may have 384 bytes allocated to a first sector of the PAC, for recording various kinds of PAC information, such as information on an "unknown PAC rule" and segments, and another area of the PAC zone may have information specific to the (optical) disc drive may be referred to as "known rules" recorded thereon.

An example structure of a PAC recorded in above structure is described with reference to FIG. 4. For convenience, in the description, particular fields of the PAC that require more detailed description will refer to drawings that illustrate the particular fields.

FIG. 4 illustrates a PAC on a high density optical disc in accordance with an example embodiment of the present invention.

Referring to FIG. 4, the PAC may include a header portion applicable to all PACs and an area having information specific to the drive, recorded thereon.

An example header portion may include 4 bytes of "PAC_ID", 4 bytes of "Unknown PAC Rules", 1 byte of "Entire Disc Flag", 1 byte of "Number of Segments", and/or 32 "segments Segment_0~Segment_31" each with 8 bytes.

The "PAC_ID" may provide the present PAC status and identification codes, for example, if the "PAC_ID" contains '00 00 00 00' bits, the "PAC_ID" indicates that the present PAC is not used, if the "PAC_ID" contains 'FF FF FF FE' bits, the "PAC_ID" indicates that the present PAC zone is not available for use due to defects or something similar, and if the "PAC_ID" contains 'FF FF FF FF' bits, the "PAC_ID" indicates that the present PAC zone is available for use again even if the PAC zone has been used previously.

By recording the "PAC_ID" in predetermined bits, such as '54 53 54 00' bits, the "PAC_ID" may be used as a code for determining if the disc is a disc for which a present drive can have free access to. That is, if the present drive does not recognize the "PAC_ID" applied thereto (possibly a case where the present drive can not recognize the present PAC due to version mismatch or similar problem), the '54 53 54 00' bits may be used as code to refer to information recorded in the "Unknown PAC Rules" field.

As described, the "Unknown PAC Rules" field may be used as a field that designates an operation range of a drive that can not recognize the present PAC, which will be described further with reference to FIG. 5.

FIG. 5 illustrates an "Unknown PAC Rules" field in accordance with an example embodiment of the present invention.

Referring to FIG. 5, a degree of controllability of various areas on the disc may be enabled by the "Unknown PAC Rules". In this example, the "Area" column in FIG. 5 represents the controllable areas on the disc, the "Control" column represents control types, such as read/write etc., and "Number of bits" column represents a number of bits required for control. The additional bits in the "Number of bits" column may represent cases of dual layer disc with two recording/reproduction sides.

For example, in the "Area" column in FIG. 5, read/write controllability of the PAC zone can be represented with "PAC zones 1, 2" fields, and write controllability of a defect management zone can be represented with "DMA Zone 1, 2" fields. Write controllability of a replacement area for a defective area can be represented with "Replacement Clusters" field, read/write controllability of a data zone can be represent with a "Data Zone" field, and logical overwrite controllability can be represented with a "Logical Overwrite" field.

Write controllability is applicable only to re-writable discs BD-RE and BD-R and the write controllability of a replacement area for a defective area is also applicable to the re-writable discs BD-RE and BD-R. As a result, various example features of the present invention may depend on the re-writable characteristics of the high density (optical) disc.

Using the above technique, the "Unknown PAC Rules" field enables designation of a controllable area on the disc for a drive with a version mismatch. Moreover, the above technique may also be applicable to control access to a particular physical area on a disc at a user's option.

Returning to FIG. 4, the "Entire Disc Flag" field may be used as a field for indicating that the PAC is applicable to an entire area of the disc and the "Number of Segments" field is a field that may represent a number of segment areas to which the PAC is applicable.

In an example embodiment, a maximum number of segments may be allocatable to one PAC. In an example embodiment, a maximum number of 32 segments can be allocated to one PAC and information on the allocated segments may be written in "Segment_0" to "Segment_31" fields, each including 8 bytes. Each of the "Segment_0~31" fields may include the first physical sector number (PSN) and the last PSN of the allocated segment area recorded thereon.

Figure 6:
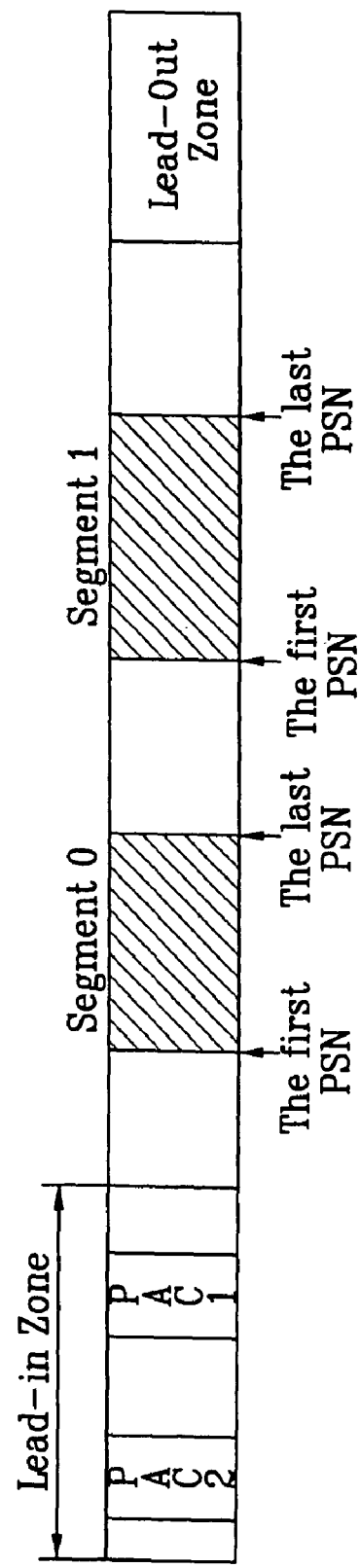
FIG. 6 illustrates segment zones on a high density optical disc in accordance with an example embodiment of the present invention.

Segments are described in more detail below. FIG. 6 illustrates segment zones on a high density optical disc in accordance with an example embodiment of the present invention.

Referring to FIG. 6, if required, there may be a maximum number (for example, 32) of segment areas on the high density optical disc, for applying the PAC thereto. The maximum number of segment area may start from "segment 0".

In an example, positions of the segment areas may be identified by an optical disc drive by writing the first PSN, which may indicate a starting position of the allocated segment area and the last PSN which may indicate the last position of the allocated segment area on "Segment" fields of PACII and PACI zones.

In an example arrangement, none of the plurality of allocated segments need overlap and the starting and ending positions may be designated at boundaries of clusters.

Thus, in example embodiments, the present invention may provide a plurality of PACs, to manage a number (for example, 32) segment areas, which are described in more detail below.

FIG. 7 illustrates a PAC zone on a high density optical disc in accordance with an example embodiment of the present invention.

Referring to FIG. 7, a plurality of valid PACs, each with a common cluster size, may be written in one PAC zone (for example, the PAC zone of INFO2 or INFO1) of 32 clusters.

In an example embodiment, the header portion may include 4 bytes of "PAC_ID", 4 bytes of "Unknown PAC Rules", 1 byte of "PAC Header Tag", 1 byte of "Entire_disc_flag", 1 byte of "Number of Segments defined", and/or 32 "segments Segment_0~Segment_31" each with, for example, 8 bytes.

The "PAC Header Tag" may be used for connecting to clusters each having a specific PAC having information specific to a drive. The "PAC Header Tag" may be incremented by one starting from (01) whenever a new PAC is added.

In this example, if the bits are FF, this indicates that no new PAC is added, and if the bits are 00, this indicates that the "PAC Header Tag" is not used.

FIG. 8 illustrates a PAC on a high density optical disc in accordance with another example embodiment of the present invention.

Referring to FIG. 8, a PAC in accordance with another example embodiment of the present invention may include a header portion and an area having specific information specific to the drive, and the header portion may further include 4 bytes of "PAC_ID", 4 bytes of "Unknown PAC Rules", 1 byte of "PAC Header Tag", 1 byte of "Entire_disc_flag", 2 bytes of "Byte address for the set of Segments", 2 bytes of "Number of Segments defined in the Set", and/or a "Reserved for Segment" field which is reserved for 32 Segments each with 8 bytes.

A PAC structure in accordance with another example embodiment of the present invention may include a Byte address for a segment set. That is, for areas reserved for Segments, a number of defined segment areas may be indicated in the "Number of Segments defined in the Set (N_Segs)" field and a byte address of a starting position may be indicated in the "Byte address for the Set of Segments" field. In this example, it may be advantageous to use the defined segments continuously.

FIG. 9 illustrates a PAC on a high density optical disc in accordance with another example embodiment of the present invention.

Referring to FIG. 9, a PAC in accordance with another example embodiment of the present invention may include a header portion and an area having specific information specific to the drive, and the header portion may further include 4 bytes of "PAC_ID", 4 bytes of "Unknown PAC Rules", 1 byte of "PAC Header Tag", 1 byte of "Entire_disc_flag", 2 bytes of "Byte address for the Main set of Segments", 2 bytes of "Number of Segments defined in the Main Set (N_M_Segs)", 2 bytes of "Byte address for the Additional set of Segments", 2 bytes of "Number of Segments defined in the Additional Set (N_A_Segs)", and/or an "Unused Part in the specific PAC" field in a specific information area specific to a particular drive.

The PAC structure in accordance with another example embodiment of the present invention may include a Main segment set and an Additional segment set. Segment areas may be allocated additionally, for use in a case when it is intended to allocate more segment areas to the 32 segment areas.

In an example, a number of the main segments defined by the "Number of Segments defined in the Main Set (N_M_Segs)" is recorded and a starting position thereof may be recorded on the "Byte address for the main Set of Segments" field. That is, the information recorded on the "Byte address for the main Set of Segments" field may serve as a pointer to the defined main segment area.

The defined additional number of segments may be recorded using the "Number of Segments defined in the Additional Set (N_A_Segs)" and a starting position thereof may be recorded on the "Byte address for the Additional Set of Segments" field.

In this example, the additional segment area may be provided with an unused part in the specific PAC in one PAC zone of 1 cluster size, may be allocated to the N_A_Segs.

The above example PAC structures enable management of additional segment areas, in addition to the 32 segment areas.

Example embodiments of the present invention are directed to recording control information on an entire disc area, an entire allocated segment area, or respective allocated segment areas by using the designated PAC, as described below.

Figure 10:
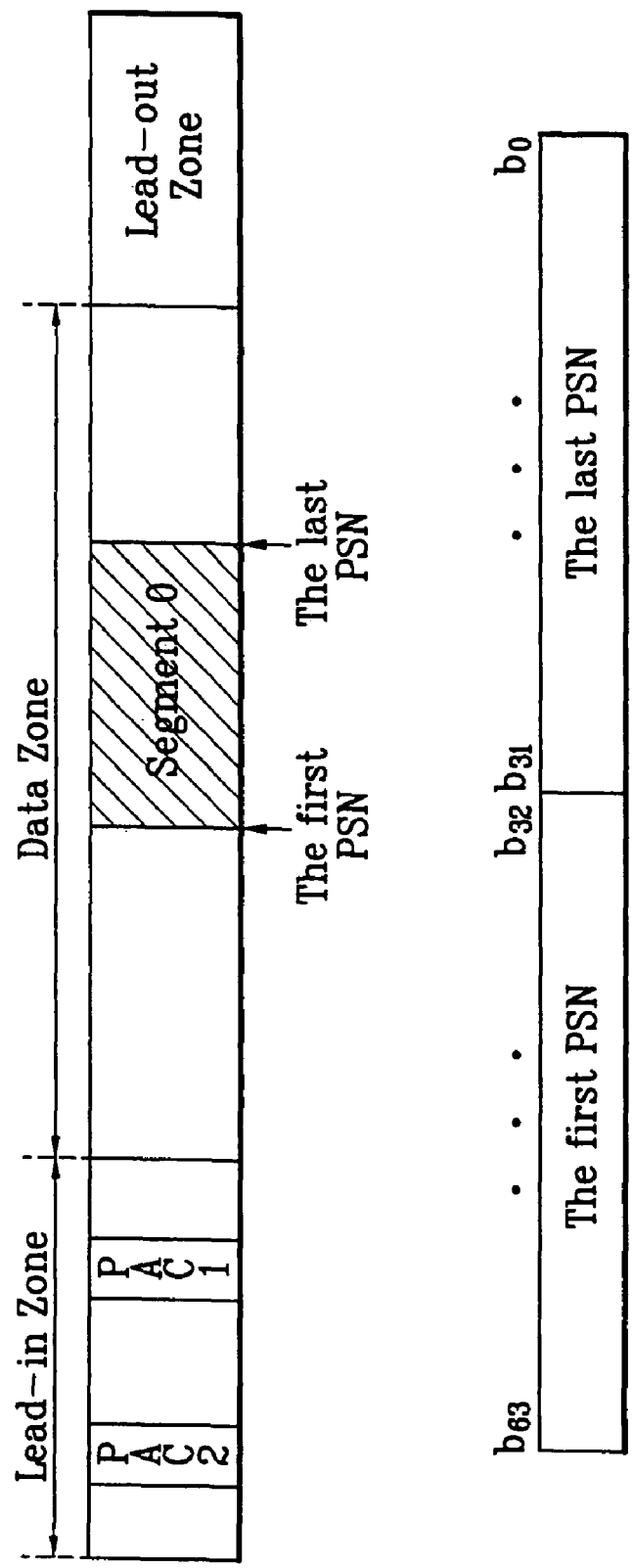
FIG. 10 illustrates control information on a segment area on a high density optical disc in accordance with an example embodiment of the present invention.

FIG. 10 illustrates control information on a segment area on a high density optical disc in accordance with an example embodiment of the present invention.

Referring to FIG. 10, an allocated segment may be represented with an 8 byte entry, wherein the first Physical Sector Number of the segment area may have a 32 byte size and the last Physical Sector Number may have a 32 byte size. Therefore, an optical disc drive can obtain position information on the allocated segment area through the segment information of the recorded PAC.

In this example, as described above, a number of segment areas (one or greater) may be managed by one or more PACs. If at least one segment area is allocated, the optical disc drive may determine the number of the allocated segment areas through the "Number of Segment" field and determine controllability, such as read, write, and/or other similar operations, on the area through "Data Zone" field of the "Unknown PAC Rule".

If no segment is allocated and the "Entire_disc_flag" field indicating that the PAC is applicable to entire disc area is recorded, as described above, though the "Data Zone" field of the "Unknown PAC Rule" is used a field indicating accessibility to the data area on the optical disc, such as read, write, and/or other similar operations, if the segment area is allocated, to write the "Number of Segment" field, the "Data Zone" field of the "Unknown PAC Rule" may be used as a field indicating accessibility to the allocated entire segment areas.

In an example embodiment of the present invention, there may be information on control of the segment area other than the position information, as information recorded on the "Segment" field, which will be described below.

Figure 11:
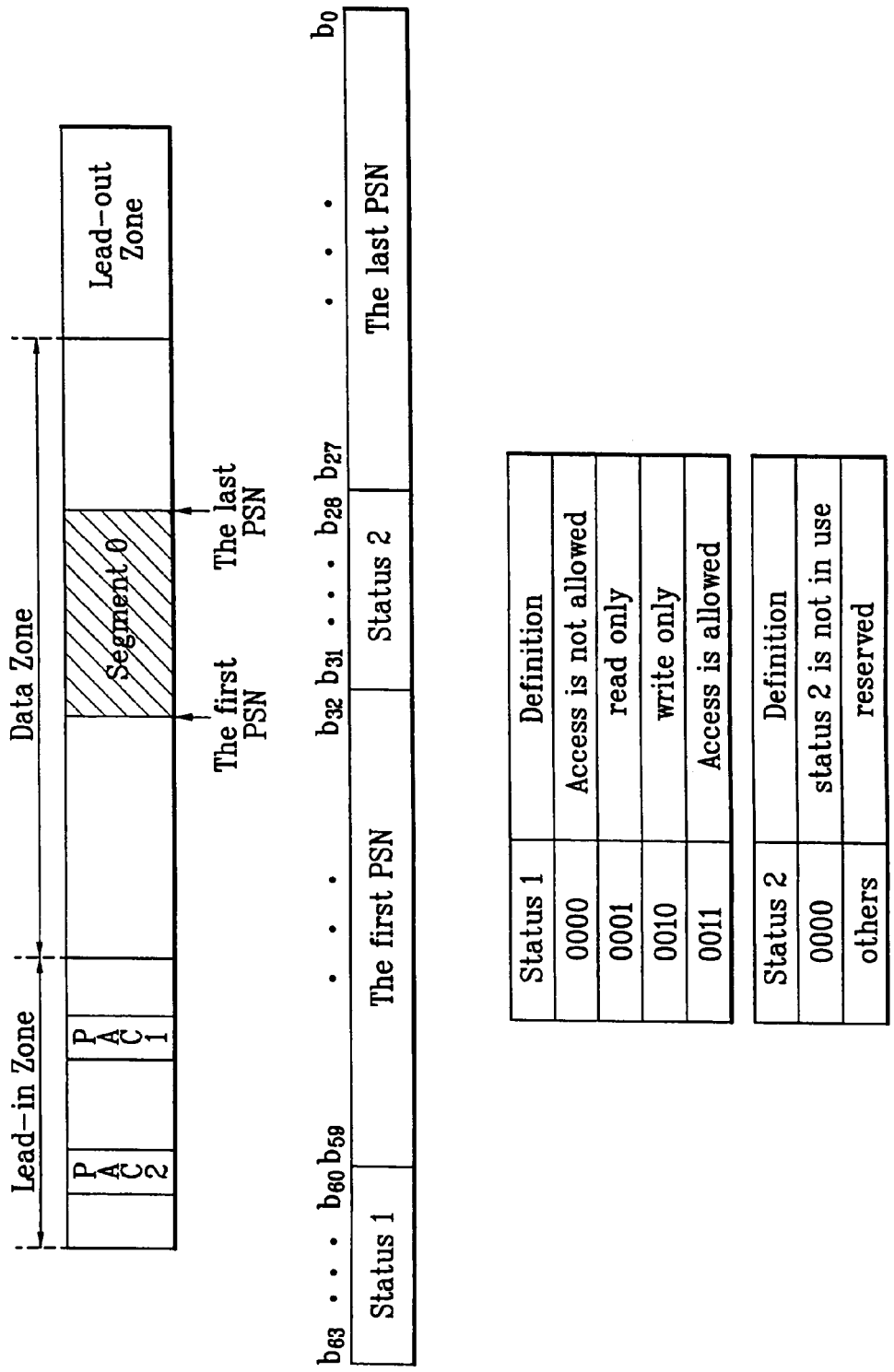
FIG. 11 illustrates control information on a segment area on a high density optical disc in accordance with another example embodiment of the present invention.

FIG. 11 illustrates control information on a segment area on a high density optical disc in accordance with another example embodiment of the present invention.

One segment may be represented with one entry and include a "Status 1" field and a "Status 2" field for indicating controllability of a relevant segment area, a "The first PSN" field for representing the first Physical Sector Number of the segment area, and/or a "The last PSN" field for representing the last Physical Sector Number of the segment area.

The "Status 1" field may be represented with four bit control information, for indicating controllability of a relevant segment area; for an example, "0000" of the "Status 1" field may indicate that access to the segment area for reproduction or recording is not possible, "0001" of the "Status 1" field may indicate that access to the segment area for read only is possible, "0010" of the "Status 1" field may indicate that access to the segment area for write only is possible, and "0011" of the "Status 1" field may indicate that access to the segment area is possible.

Therefore, by determining accessibility to a relevant segment area using the "Status 1" field and "Status 2 field, unnecessary access operations to the segment area can be reduced, and in a case a plurality of segment areas are allocated, access to each of the segments can be controlled.

In this example, because the "Status 2" field may be a reserved field for future use and not in use presently, in on example, the "Status 2" field is recorded in "0000" bit.

When the segment area is allocated, the control of each of the segment areas may not be consistent with the controllability on the segment area defined at the "Data Zone" field of the "Unknown PAC Rules".

That is, for an example, despite all types of access, such as read and write to entire segment areas is possible in the "Data Zone", only reading of a relevant segment area may be possible in the "Segment" field.

In this example, read only control of the segment area the "Segment" field indicates is possible. That is, depending on the controllability of the "Data Zone", the control of the segment area may be made possible using an "AND" condition with the "Segment" field.

Accordingly, if the "Data Zone" field indicates that access to entire segment areas allocated to the "Data Zone" field for read or write not possible, access to the entire segment areas will become impossible regardless of controllability on the "Segment" field, and even the "Data Zone" field is set such that access to entire segment areas is possible, if it is set that access to individual segment areas is impossible, access to the segment area is impossible.

As described, with regard to a PAC of a high density optical disc, a writing control portion thereof may be applicable to a physically writable high density optical disc BD-R, and BD-RE, and may depend on the writable characteristics of the high density optical disc.

By recording a first physical sector number of a relevant segment area on the "The first PSN" field of FIG. 11 and a last physical sector number of a relevant segment area on the "The last PSN" field of FIG. 11, a position of the segment area on the disc can be indicated.

Figure 12:
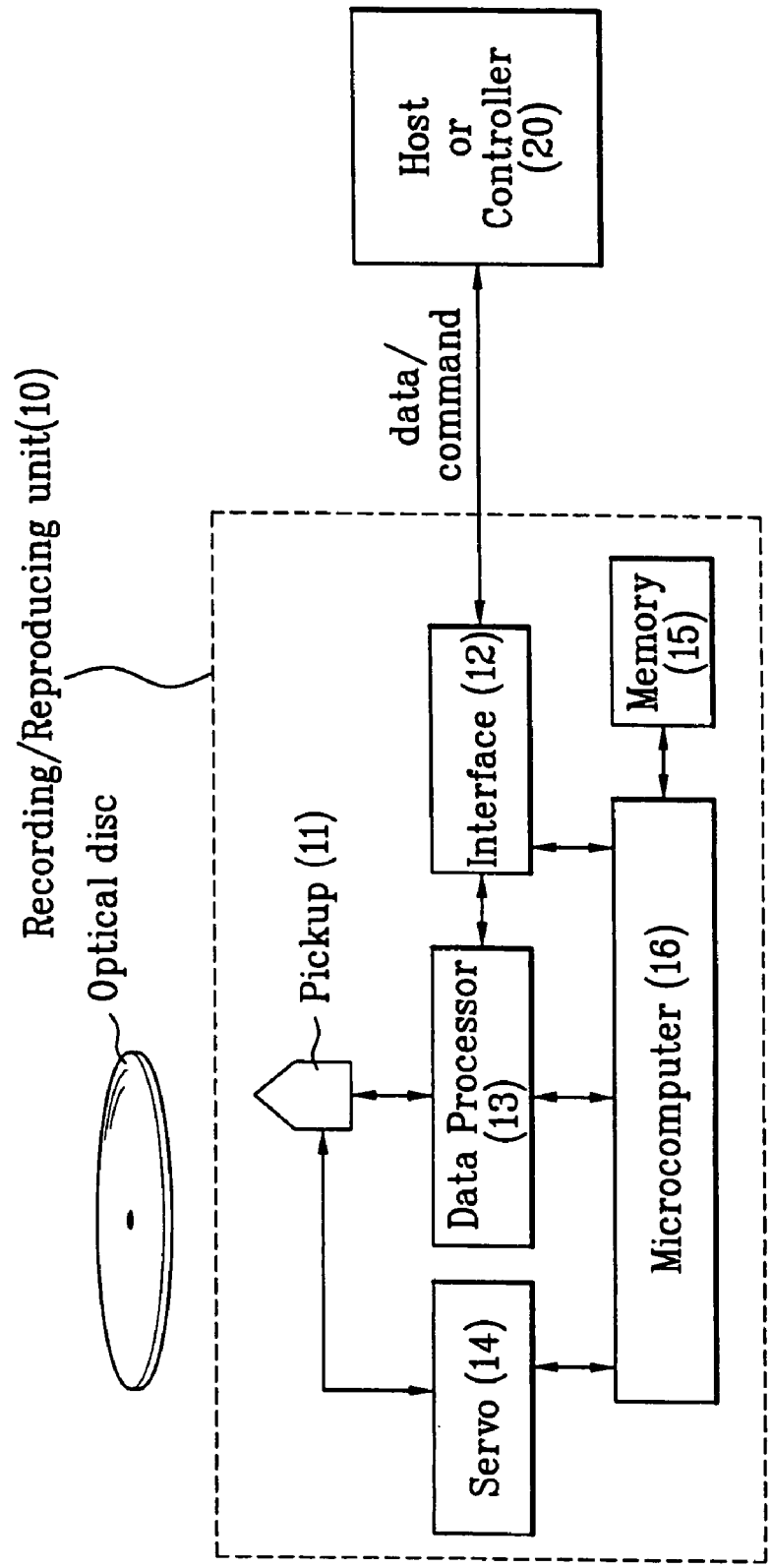
FIG. 12 illustrates a block diagram of an optical recording and reproducing apparatus in accordance with an example embodiment of the present invention.

FIG. 12 illustrates a block diagram of an optical recording/reproducing apparatus in accordance with an example embodiment of the present invention.

Referring to FIG. 12, the optical recording/reproducing apparatus may include a recording/reproducing device 10 for performing recording/reproduction on the optical disc and a host, or controller 20 for controlling the recording/reproducing device 10. In an example embodiment, the recording/reproducing device 10 may act as the "optical disc drive"

discussed above in conjunction with many example embodiments of the present invention.

In an example embodiment, the host 20 gives a writing or reproduction instruction to write to or reproduce from a particular area of the optical disc to the recording/reproducing device 10, and the recording/reproducing device 10 performs the recording/reproduction to/from the particular area in response to the instruction from the host 20.

The recording/reproducing device 10 may further include an interface part 12 for performing communication, such as exchange of data and instructions with the host 20, a pickup part 11 for writing/reading a data to/from the optical disc directly, a data processor 13 for receiving a signal from the pickup part 11 and recovering a desired signal value or modulating a signal to be written into a signal able to be written on the optical disc, a servo part 14 for controlling the pickup part 11 to read a signal from the optical disc accurately or to write a signal on the optical disc accurately, a memory 15 for temporary storage of various kinds of information including management information and data, and a microcomputer 16 for controlling various parts of the recording/reproducing device 10.

An example method for recording a PAC on a high density writable optical disc using the example optical recording/reproducing apparatus will be described below.

Upon inserting the optical disc into the optical recording/reproducing apparatus, management information may be read from the optical disc and stored in the memory 15 of the recording/reproducing device 10, for use at the time of recording/reproduction of the optical disc.

In this state, if the user desires to write on a particular area of the optical disc, the host 20, taking this as a writing instruction, provides information on a desired writing position to the recording/reproducing device 10, together with a data to be written.

The microcomputer 16 in the recording/reproducing device 10 may receive the writing instruction, determine if the area of the optical disc the host 20 desires to write is a defective area or not from the management information stored in the memory 15, and/or perform data writing according to the writing instruction from the host 20 on an area which is not a defective area.

If it is determined that writing on an entire disc or on a particular area of the disc includes new features which a previous version of the recording/reproducing device is not provided with, leading the previous version of the recording/reproducing device to fail to sense, or if it is intended to restrict functions, such as writing or reproducing to/from a particular area of the disc according to restriction set by the user, the microcomputer 16 of the recording/reproducing device 10 may write control information of the area in the PAC zone on the disc as an "Unknown PAC rule". The microcomputer 16 of the recording/reproducing device 10 may also write PAC information, such as the PAC_ID for a written state, and segment information which is control information on the particular area of the disc.

In this example, if the recorded PAC includes control information for entire disc area, the "Entire Disc Flag" field may be recorded, and if at least one segment area is allocated on an area of the disc, to control access to the entire area, a number of the allocated segment areas is recorded on the "Number of Segment" field, and control information, such as accessibility and/or other relevant information, may be recorded on the "Data Zone" field of the "Unknown PAC Rule". If it is desired to individually control the segment areas, control and position information of the segment may be recorded on the "Segment" field.

A PAC may be recorded on the PAC2 zone of the INFO2 zone at one cluster size and the PAC and a copy PAC of the PAC may be recorded on the PAC1 zone of the INFO1 zone as a backup.

The microcomputer 16 may provide position information of the area the data is written thereon, or the PAC zone, and the data to the servo 14 and the data processor 13, so that the writing is finished at a desired position on the optical disc through the pickup part 11.

Additionally, a method for recording/reproducing the high density optical disc having PAC information written by the above example method will be described below.

Upon inserting an optical disc into the optical recording/reproducing apparatus, management information may be read from the optical disc and stored in the memory 15 of the recording and reproducing device 10, for use at the time of recording and reproduction of the optical disc.

The information in the memory 10 may include position information of various zones included in the PAC zone on the disc. Particularly, positions of valid PACs in the PAC zone may be known from disc definition structure (DDS) information. After positions of the valid PACs are known, a PAC_ID field of the PAC may be examined, for verifying if the PAC_ID is an identifiable PAC_ID.

If the PAC_ID is identifiable, the method determines that a recording and reproducing device having written the data on the disc has a version identical to a version of the present recording and reproducing device or there are no separate writing/reproduction restrictions, and the recording/reproduction is performed according to the instruction from the host 20.

If the PAC_ID is not identifiable, the method determines that the recording and reproducing device having written the data on the disc has a version different from the version of the present recording and reproducing device, and the recording/reproduction is preformed according to the instruction from the host with reference to recording/reproduction restriction areas on the disc including the "Unknown PAC rule" and the "segment".

Accordingly, the microcomputer 16 provides the location information and data according to the instruction from the host to the servo 14 and the data-processor 13, so that the recording/reproduction is finished at a desired location on the optical disc through the pickup part 11.

As described above, the methods and apparatus for recording and reproducing in a high density optical write-once disc according to example embodiments of the present invention may have one or more of the following advantages.

First, the definition of an accessible area of a disc of a different version drive by using PACs may permit more robust protection of a data area having user data recorded thereon, for example, to prevent or reduce unauthorized access (for example, hacking).

Second, effective recording data to and/or reproducing data from a high density optical disc is improved by using a PAC which manages the entire data area or a part of the data area of the disc.

It will be apparent to those skilled in the art that various modifications and variations can be made to the example embodiments of the present invention described above without departing from the spirit or scope of the invention. Thus, it is intended that the present invention covers the modifications and variations of this invention provided they come within the scope of the appended claims and their equivalents.

What is claimed is:

1. A recording medium having an executable data structure for managing reproduction of the recording medium, comprising:
a user data area including a plurality of segment regions for storing user data, the segment regions including a plurality of sectors; and
a control data area storing one or more access control information controlling access to the segment regions and enlarging a reproduction compatibility of the recording medium, the access control information specifying a plurality of segment regions in the user data area to which the corresponding access control information is applied, the access control information including a segment number field for identifying a number of the segment regions specified by the corresponding access control information and a segment list for identifying the specified segment regions,
wherein the number of the specified segment regions is less than or equal to a predetermined maximum value.

2. The recording medium of claim 1, wherein the predetermined maximum value is the maximum number of the segment regions that can be included in the computer readable medium.

3. The recording medium of claim 1, wherein the predetermined maximum value is 32.

4. The recording medium of claim 1, wherein each segment region has a number from zero to a desired number.

5. The recording medium of claim 1, wherein the access control information carries out a specific function or application.

6. The recording medium of claim 1, wherein the access control information includes a rule used when the access control information is not identified by an apparatus attempting to record/reproduce on/from the recording medium.

7. The recording medium of claim 6, wherein the rule is used for controlling the access to the recording medium including the segment regions when a version of the access control information is identified by the apparatus.

8. The recording medium of claim 7, wherein the rule includes data zone bit indicating actions available for the segment regions.

9. The recording medium of claim 8, wherein the actions include reading and/or writing.

10. The recording medium of claim 1, wherein the access control information includes:
a header portion including information for the segment regions, and
a specific information portion including information specific to each of the access control information.

11. A method for access control of a computer readable medium, comprising:
reading one or more access control information for controlling access to the plurality of segment regions specified by the access control information and enlarging a reproduction compatibility of the recording medium, the segment region including a plurality of sectors, the access control information including a segment number field for identifying a number of the segment regions specified by the corresponding access control information for storing user data and a segment list for identifying the specified segment regions; and
controlling the access to a plurality of segment regions according to the access control information,
wherein the number of the specified segment regions is less than or equal to a predetermined maximum value.

12. The method of claim 11, wherein the predetermined maximum value is the maximum number of the segment regions that can be included in the recording medium.

13. The method of claim 11, wherein the predetermined maximum value is 32.

14. The method of claim 11, wherein each segment region has a number from zero to a desired number.

15. The method of claim 11, the method further comprising identifying segment regions according to address information of the segment regions included in the access control information.

16. The method of claim 11, wherein the access control information includes a rule used when the access control information is not identified by an apparatus attempting to record/reproduce on/from the recording medium.

17. The method of claim 16, wherein the rule includes data zone bit indicating actions available for each of the segment regions.

18. The method of claim 17, wherein the actions include reading and/or writing.

19. An apparatus for access control of a computer readable medium, comprising:
a pickup configured to read from the recording medium; and
a controller configured to control the pickup based on access control information for controlling access to a plurality of segment regions in a user data area and enlarging a reproduction compatibility of the computer readable medium, the segment region including a plurality of sectors, the access control information specifying the segment regions to which the corresponding access control information is applied, the access control information including a segment number field for identifying a number of the segment regions specified by the corresponding access control information for storing user data and a segment list for identifying the specified segment regions,
wherein the number of the specified segment regions is less than or equal to a predetermined maximum value.

20. The apparatus of claim 19, wherein the predetermined maximum value is the maximum number of the segment regions that can be included in the recording medium.

21. The apparatus of claim 19, wherein the predetermined maximum value is 32.

22. The apparatus of claim 19, wherein each segment region has a number from zero to a desired number.

23. The apparatus of claim 19, wherein the access control information includes address information of the segment regions.

24. The apparatus of claim 19, wherein the access control information includes a rule used when the access control information is not identified by an apparatus attempting to record/reproduce on/from the recording medium.

25. The apparatus of claim 24, wherein the controller controls the access to the segment regions according to the rule included in the access control information when a version of the access control information is not identified by the apparatus.

26. The apparatus of claim 25, wherein the rule includes data zone bit indicating actions available for each of the segment regions.

27. The apparatus of claim 26, wherein the actions include reading and/or writing.

28. The apparatus of claim 19, wherein the controller is configured to be connected with a host generating a command of recording/reproducing the data.

29. A method for recording data/information in a recording medium, comprising:
generating one or more access control information for controlling access to a plurality of segment regions within a user data area of the recording medium and for enlarging a reproduction compatibility of the recording medium, the segment region including a plurality of sectors, the access control information specifying the segment regions to which the corresponding access control information is applied, the access control information including a segment number field for identifying a number of the segment regions specified by the corresponding access control information for storing user data and a segment list for identifying the specified segment regions, wherein the number of the specified segment regions is less than or equal to a predetermined maximum value; and
recording the access control information in a control data area of the recording medium.

30. The method of claim 29, wherein the access control information includes a predetermined rule for controlling the access to the segment regions when a version of the access control information is not identified by an apparatus attempting to read/reproduce on/from the recording medium.

31. The method of claim 29, wherein the access control information is recorded in the control data area within an inner circumference of the recording medium.

32. The method of claim 29, further comprising:
recording a copy of the access control information in the control data area.

33. An apparatus for recording data/information in a recording medium, comprising:
a pickup configured to record/reproduce data on/from the recording medium; and
a controller operably coupled to the pickup and configured to control the pickup to record one or more access control information in a control data area of the recording medium, the access control information controlling access to a plurality of segment regions within a user data area of the recording medium and enlarging a reproduction compatibility of the recording medium, the segment region including a plurality of sectors, the access control information specifying the segment regions to which the corresponding access control information is applied, the access control information including a segment number field for identifying a number of the segment regions specified by the corresponding access control information for storing user data and a segment list for identifying the specified segment regions, wherein the number of the specified segment regions is less than or equal to a predetermined maximum value.

34. The apparatus of claim 33, wherein the controller is configured to control the access to the segment regions based on a predetermined rule in the access control information when the controller can not identify a version of the access control information.

35. The apparatus of claim 34, wherein the controller is configured to control the pickup to record the access control information in the control data area within an inner circumference of the recording medium.

36. The apparatus of claim 34, wherein the controller is further configured to control the pickup to record a copy of the access control information in the control data area.

37. The recording medium of claim 1, wherein the access control information includes indication information for indicating whether the corresponding access control information was previously used to control the access.

38. The recording medium of claim 37, wherein the indication information further indicates whether the corresponding access control information is available for re-use.

39. The recording medium of claim 1, wherein the access control information is recorded in the control data area before the user data is recorded in the user data area.

40. The recording medium of claim 1, wherein total number of the segment regions specified by the access control information is limited to the maximum value.

* * * * *

UNITED STATES PATENT AND TRADEMARK OFFICE
CERTIFICATE OF CORRECTION

PATENT NO. : 7,852,741 B2
APPLICATION NO. : 11/798110
DATED : December 14, 2010
INVENTOR(S) : Yong Cheol Park It is certified that error appears in the above-identified patent and that said Letters Patent is hereby corrected as shown below:

Column 1, please add the following paragraph to the beginning of the Specification on page 1:

This U.S. nonprovisional application is a continuation of U.S. Application No. 11/061,665, filed February 22, 2005, which claims priority under 35 U.S.C. §119 to Korean Patent Application No. 10-2004-0039143, filed on May 31, 2004, in the Korean Intellectual Property Office, which also claims priority to U.S. Provisional Application No. 60/553,960, filed on March 18, 2004 and U.S. Provisional Application No. 60/554,409, filed on March 23, 2004, the disclosure of each of which is incorporated herein in its entirety by reference.

Signed and Sealed this
Sixth Day of December, 2011

David J. Kappos
*Director of the United States Patent and Trademark Office*